July 13, 1926.

C. H. WILLS ET AL 1,592,246

VEHICLE LIGHT

Filed Nov. 6, 1920

Witness:
R. Burkhardt.

Inventors:
C. Harold Wills,
Cromwell A.B. Halvorson Jr.

Patented July 13, 1926.

1,592,246

UNITED STATES PATENT OFFICE.

CHILDE HAROLD WILLS, OF MARYSVILLE, MICHIGAN, AND CROMWELL A. B HALVORSON, JR., OF LYNN, MASSACHUSETTS.

VEHICLE LIGHT.

Application filed November 6, 1920. Serial No. 422,132.

This invention relates to a new and improved illuminating system for motor vehicles, and more specifically to a lamp associated with the usual lighting circuit, the lamp being to furnish rearwardly directed illumination.

The usual lighting circuit for motor vehicles includes a source of power, head lights and a low power tail light. In the use of a vehicle provided with such a circuit, no means are provided for illuminating the roadway in the rear of the vehicle. It is often highly desirable in backing the vehicle at night to have an effective rear illumination.

It is an object of the present invention to provide a vehicle lighting system which includes a light adapted for illuminating effect rearwardly. It is a further object to provide such a lamp which is electrically associated with the main lighting circuit and which may be selectively connected to the circuit. It is also an object to provide an automatically operable switch for such a lamp, the switch being associated with the vehicle gear set and operable by the reverse rod of such gear set. It is an additional object to provide a lamp of this character in association with a usual tail lamp of low power. The two lamps being preferably enclosed in a single casing. Other and further objects will appear as the description proceeds.

The present invention provides an illuminating light adapted to be directed rearwardly and electrically associated with the main lighting circuit. As such a light obviously will be used intermittently and but for short periods of time, it has not been included directly in the main lighting circuit. While it may be thrown into or out of that circuit by a manually operated switch, we consider it preferable to provide means for automatically throwing the light into circuit when the vehicle is reversed. In the particular embodiment shown this means comprises a switch associated with the gear shift assembly of the vehicle and operated by the reverse gear rod to close the switch when the gears are in mesh in the reverse position. This particular association of the switch automatically causes the lamp to be lighted when the gears are shifted to reverse and the illumination is thus had independently of the clutch and before the vehicle itself is put in motion rearwardly.

Our rear illuminating lamp is, of course, additional to the usual rear tail light, and it is preferably enclosed in a single shell with that light.

We have illustrated a preferred embodiment of the invention in the accompanying drawings in which—

Figure 1:
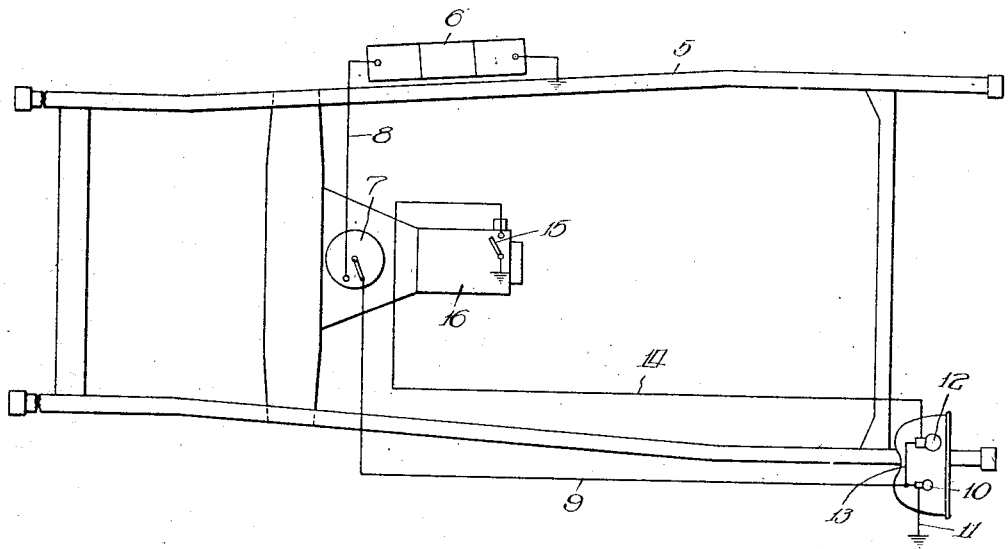
Figure 2:
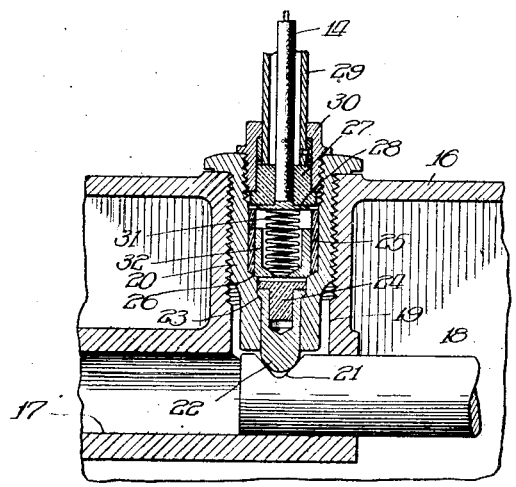

Figure 1 is a diagram illustrating a preferred lighting circuit for use for such a lamp; and Figure 2 is a fragmentary sectional detail view showing a switch associated with the gear shift member for closing the circuit.

In Figure 1 we have shown our rear illuminating lamp in a grounded return wiring system. While such a system is considered preferable for the purpose, our invention is not limited thereto. The vehicle frame is designated 5, the battery 6 having its negative side grounded to the frame. Its opposite or positive side is connected to the main switch 7 by the wire 8, the main switch being preferably located on the instrument board of the vehicle and being manually operable. The wire 9 is led from the negative pole of the switch 7 to the tail light 10. The opposite side of the tail light is grounded, as indicated, at 11, the frame of the vehicle serving as the return. Our rear illuminating lamp 12 is located in the same shell with the rear tail light 10 and is connected to the main circuit wire 9 by the wire 13. The opposite side of the lamp 12 is connected by the wire 14 to the switch 15 located upon the gear casing 16. The negative side of this switch 15 is grounded to the gear casing and thus to the vehicle frame.

In Figure 2 the switch 15 has been shown in detail. A fragmentary portion of the gear casing 16 is shown and is provided with a tubular passage 17 therein. The rear end of the reverse gear rod 18 extends into this passage 17 and, as seen in the figure has been moved to the right to throw the gears into reverse position. The hole 19 is drilled into the gear casing 16 at right angles to the opening 17 and intersects the opening. The gear rod 18 is provided with an inclined recess or notch 21, into which fits the rounded lower end of the plunger 22. The upper portion of this plunger is enlarged to seat against the shoulder 23 in the switch container 20, and its upper end is provided with an insulating member 24.

The insulated tube 25 is seated in the opening in the switch container 20 its lower end fitting against the shoulder 26. The wire 14 extends downwardly through the bushing 27, its lower end being provided with a contact 28 seated on the inner face of the bushing. The wire is protected by the conduit 29, the lower end of which is retained by the inturned edge of the cap 30. The spring 31 is seated in the lower cupshaped contact member 32, its upper end bearing against the contact 28. The contacts 28 and 32 are thus electrically connected by the spring 31. With the parts in the position shown in the drawing, the cup 32 engages a portion of the shoulder 26, thus grounding the wire 14 to the gear casing and closing the ground return circuit. When the rod 18 is moved to the left, the plunger 22 rides up out of its seat 21 against the resistance of its spring 31 and the cup 32 rests upon the insulation 24, the contact with the shoulder 26 is broken and hence the circuit is opened.

We have not shown any head lights as included in our lighting circuit since they form no part of the present invention, such lights may be connected in this circuit or may be upon an independent circuit. The usual lights are thrown in by closing the circuit at the switch 7. The circuit then comprises the battery 6, wire 8, switch 7, wire 9, tail light 10, wire 11, and ground return through the frame 5 to the battery 6. The switch 15 is normally open, and therefore, although the lamp 12 is connected by means of the wire 13 to the tail light circuit, no current flows to the lamp, when, however, the switch 15 is closed, the lamp 12 is connected to the ground return through the wire 14 and the lamp is therefore illuminated.

The lamp 12 will be only occasionally used and since it is not in the normal field of vision of the driver, it is particularly desirable that switch 15 be automatically operated by the reverse gear. In this way, waste of current through illumination of the lamp 12 when not necessary or desirable is eliminated. The automatic switch is also valuable in that it avoids the necessity for the manual operation of an additional switch by the driver of the machine.

While we have described more or less precisely the details of construction of our invention, we do not wish to be understood as limiting ourselves thereto, as we contemplate changes in form and the proportion of parts and substitution of equivalents as circumstances may suggest or render expedient, without departing from the spirit of our invention, and within the scope of the appended claims.

We claim:

1. A switch comprising a container, a wire, a contact connected to the wire and located in and insulated from the container, spring pressed contact means normally grounding the wire contact to the container, and a plunger extending from the container and urged outwardly by the spring pressed contact, pressure on the plunger serving to move the contact against the spring pressure out of grounding engagement with the container.

2. A switch comprising a container of conducting material, a wire, a contact connected to the wire and enclosed by said container and insulated therefrom, spring pressed conducting means permanently engaging the wire contact and normally engaging the container and grounding the wire thereto, and a plunger extending from the container and adapted to be forced into the container to move the spring pressed conducting means out of contact with the container.

Signed at Marysville, Michigan, this 19th day of October, 1920.

CHILDE HAROLD WILLS.
CROMWELL A. B. HALVORSON, Jr.